United States Patent [19]

Houseman

[11] 3,711,827
[45] Jan. 16, 1973

[54] BRAKE FAILURE WARNING SYSTEM
[75] Inventor: Paul S. Houseman, South Bend, Ind.
[73] Assignee: The Bendix Corporation
[22] Filed: Sept. 30, 1970
[21] Appl. No.: 76,932

[52] U.S. Cl. ..............................340/52 B, 340/52 F
[51] Int. Cl. ............................................B60t 17/22
[58] Field of Search ............340/52 R, 52 B, 52 F, 27

[56] References Cited

UNITED STATES PATENTS

| | | | |
|---|---|---|---|
| 2,735,081 | 2/1956 | Hosford | 340/27 NA |
| 3,541,550 | 11/1970 | Hambre | 340/27 X |

*Primary Examiner*—Alvin H. Waring
*Attorney*—William N. Antonis and Plante, Hartz, Smith & Thompson

[57] ABSTRACT

A brake failure warning light that monitors a number of functions. If one of the functions is out of tolerance, the light will be energized. By inclusion of an oscillating signal and control logic, the light will flash. Also, a bimetal switch could be used to periodically interrupt energy being delivered to the light. A self test is incorporated to determine if the warning light is operating properly. The functions being monitored by the warning light are the brake master cylinder fluid levels, the electronic control unit for an adaptive braking system and the braking pressure differential in a split system.

3 Claims, 5 Drawing Figures

PATENTED JAN 16 1973 3,711,827

*INVENTOR.*
PAUL S. HOUSEMAN
BY *Plante, Hartz, Smith & Thompson*
ATTORNEYS

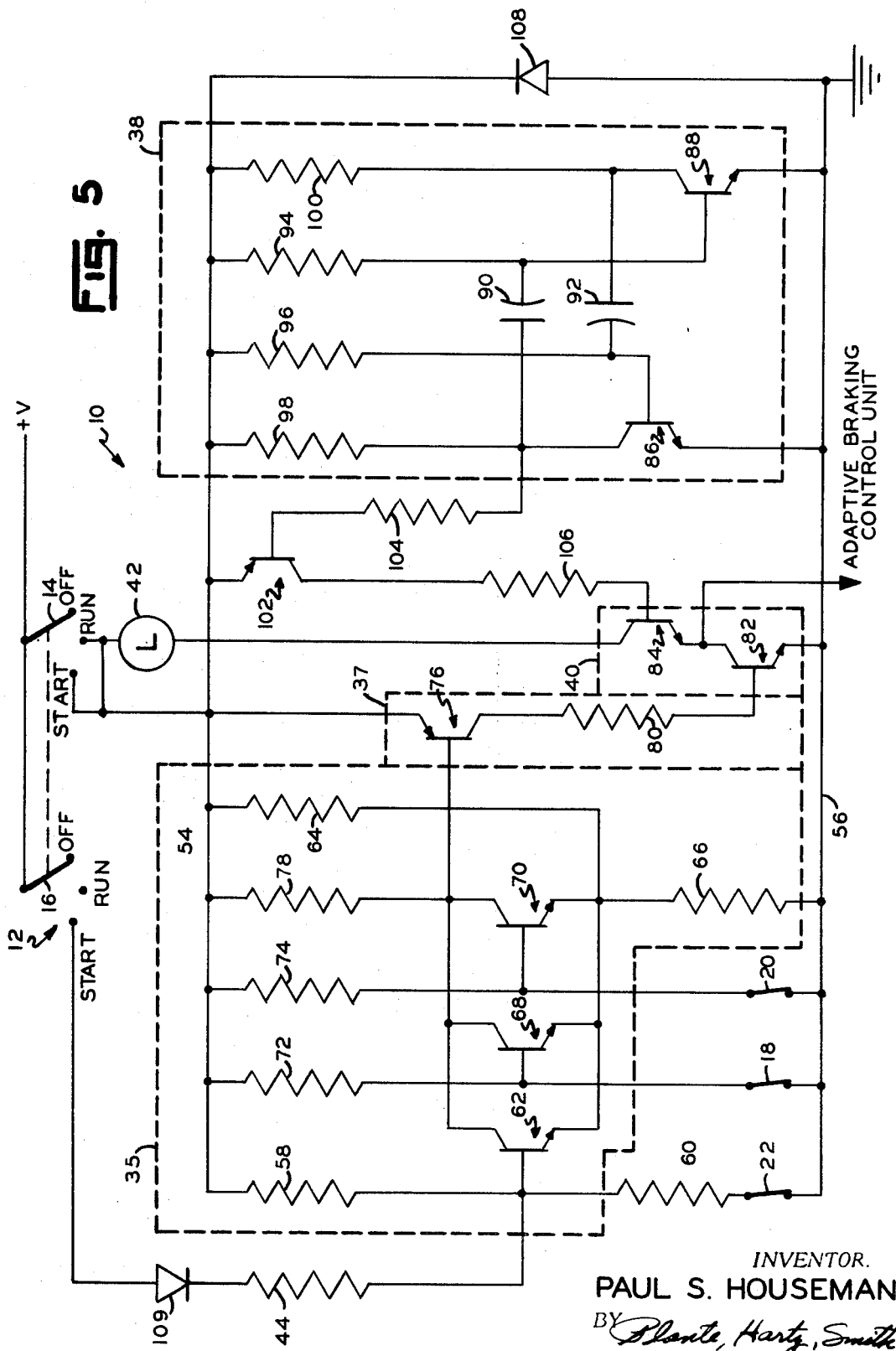

BRAKE FAILURE WARNING SYSTEM

BACKGROUND OF THE INVENTION

As today's automobiles become more complex, additional warning indication devices are required to monitor failure or out-of-tolerance conditions within the automotive vehicle. The early automobiles required very few, if any, indicating devices. As time and technology progressed, a few simple warning or indication devices were included. Some of these simple devices include fuel gauge, temperature indicator, generator charge, oil pressure, etc. With increased technology, the automobile of today has become a very complicated machine. With the increase in complexity, there is a simultaneous increase in the number of possible failures. Hence, it becomes increasingly important for the automobile manufacturer to include warning devices that could monitor the various possible failures or out-of-tolerance conditions that could conceivably result in personal or property damage by the vehicle operator. If a separate warning indication device had to used for each monitored condition, an almost endless number of warning devices would be required. To eliminate the need for such a large number of warning devices, it is very desirable if one warning device can be used to monitor numerous conditions within the automotive vehicle.

Referring more specifically to the braking system of the automotive vehicle, it is desirable to indicate more than whether or not the brakes are, or are not, operable. Suppose there is an instantaneous brake failure while a person is driving down a busy street. This instantaneous brake failure could result in serious injury or property damage to persons or property involved in a subsequent automotive accident. There are economic devices today that can indicate to the operator of the vehicle whether his brake fluid is low, whether he has a pressure differential between his front and rear brakes during a brake application, or, with the coming acceptance of adaptive braking, whether the electronic control unit of the adaptive braking system is functioning properly. Low fluid level indication is a warning of potential future failure. Differential pressure is an indication of partial, not total, brake failure. Adaptive braking is a system malfunction. These are just a few of the more desirable parameters that may be monitored on future automotive vehicles.

SUMMARY OF THE INVENTION

It is an object of the present invention to use a single warning device to monitor a number of out-of-tolerance conditions.

It is a further object of the present invention to monitor various brake parameters and give a single warning if one or more of the brake parameters is out of tolerance.

It is a still further object of the present invention to provide a flashing indicator light when one of the parameters in the braking system of an automotive vehicle is out of tolerance.

It is an even further object of the present invention to monitor the fluid levels, pressure differential and electronic control unit in a braking system of an automotive vehicle with a warning light being flashed if one of the monitored conditions is out of tolerance.

It is another object of the present invention to provide a self test for the brake failure indication system.

It is still another object of the present invention to show various embodiments that can be economically manufactured wherein one warning device will monitor a number of out-of-tolerance conditions in the braking system.

BRAKING DESCRIPTION OF THE DRAWINGS

FIG. 5 is a detailed electrical schematic of a brake failure warning system that is functionally the same as FIG. 1.

DESCRIPTION OF THE PREFERRED EMBODIMENTS

Figure 1:
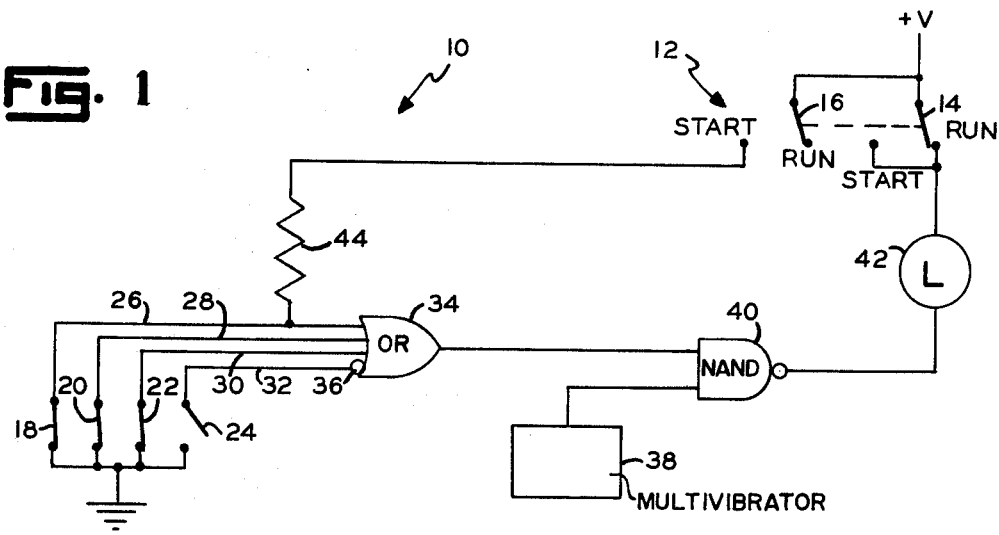
FIG. 1 is an illustrative block diagram of one embodiment of the brake failure warning system.

Referring to the first embodiment shown in FIG. 1, the brake failure warning system, indicated generally by reference numeral 10, is operated from the automotive vehicle battery voltage +V. A double pole, double throw switch 12 is provided by the ignition of the automotive vehicle so that wiper arm 14 is continuously energized when the automotive vehicle is in the START or RUN position. Wiper arm 16 is energized only when the ignition is in the START position. Neither wiper arm 14 nor 16 will be energized when the ignition switch 12 is OFF (not shown). However, it could be possible for the voltage to be continuously applied to the brake failure warning system with a minimum amount of current drain.

In referring to the details of the circuit shown in FIG. 1, switches 18 and 20 continuously monitor the fluid level in a slip braking system. If the fluid level in one reservoir of a dual master cylinder is low, then one of the fluid level switches 18 or 20 will open. If the fluid level in both chambers of the master cylinder is low, then both fluid level switches 18 and 20 will open. For details of a fluid level indicating switch that can be used in the present invention, see U. S. Pat. application Ser. No. 689,088, filed on Dec. 8, 1967 and having a common assignee as the present invention. Switch 22 is a pressure differential switch that is normally closed. However, if a pressure differential exists between the front and rear brakes in a slip braking system during a brake application, then switch 22 will open. Alternatively, a normally open switch can be used if connected in the appropriate manner. Typical examples of pressure switches for use in split braking systems can be found in U. S. application Ser. No. 832,162, filed on June 11, 1969; U. S. application Ser. No. 42,110, filed on June 1, 1970; and U. S. application Ser. No. 670, filed on Jan. 5, 1970. Switch 24, which is a normally open switch, closes when there is a failure in the electronic control unit of an adaptive braking system (not shown). A typical example of a failure indication switch for an adaptive braking system is shown in U. S. application Ser. No. 785,664, filed on Dec. 20, 1968.

One side of the fluid level switches 18 and 20, the pressure differential switch 22, and the electronic control unit switch 24 is connected to ground. The other side of the switches 18, 20 and 22 and 24 form separate inputs 26, 28 30 and 32 to OR gate 34. The input 32 is inverted by inverter 36 so that OR gate 34 will only have ground input when the switches 18, 20, 22 and 24 are in their normal condition. If while the vehicle ignition switch 12 is in the RUN position, one of the switches 18, 20, 22 or 24 is changed from its normal position as shown in FIG. 1, then OR gate 34 would give a positive voltage output. Since switch 18, 20, 22 or 24 would change from its normal position only if an out-of-tolerance condition exists, then an output from OR gate 34 indicates that the braking system is not functioning properly.

This output from OR gate 34 could be used directly to drive a warning device. However, to flash an indicator light at a given frequency, multi-vibrator 38 and NAND gate 40 have been included. The multivibrator 38 which may give an output anywhere from 0.1 to 10 Hertz is utilized to alternately flash an indicator light 42. Normal operating frequency of multi-vibrator 38 will be one to 2 cycles per second. The output of multi-vibrator 38 and the output of OR gate 34 are fed into NAND gate 40 to alternately close and open a conduction path to ground for indicator light 40 when an out-of-tolerance condition has changed the position of one of the switches 18, 20, 22 or 24. Though not shown, the power used to operate OR gate 34, multi-vibrator 38, and NAND gate 40 is supplied by the vehicle battery +V when the ignition switch 12 is in the START or RUN position. Though power could be applied when the ignition switch 12 is in the OFF position without lighting the indicating light 42, this could cause a small current drain on the vehicle battery and, therefore, is not included in the preferred embodiment. Wiper arm 14 completes the circuit by connecting indicator lamp 42 to the vehicle battery +V so that the lamp 42 will light when a ground output is received from NAND gate 40 and the ignition switch 12 is in the START or RUN position.

Also provided in FIG. 1 is a means to self test the brake failure warning system 10. Resistor 44 which is connected on one end to one of the inputs 26, 28 or 30 and, on the other end to a start contact for wiper arm 16. Hence, the battery voltage +V is connected through resistor 44 to one of the inputs of OR gate 34 so that indicator lamp 42 will flash during the starting of the automotive vehicle. This test feature will tell the operator of the vehicle if lamp 42 is burned out or if OR gate 34, NAND gate 40, or multi-vibrator 38 is not functioning properly.

It should be obvious to those skilled in the art that the four functions monitored by switches 18, 20, 22 and 24 are just a few of an almost endless list of functions in a braking system that could be monitored. It is also clearly obvious to those skilled in the art that the warning indication system as shown in FIG. 10 can be used to monitor any type of unrelated tolerance condition and utilize a single warning device.

Figure 2:
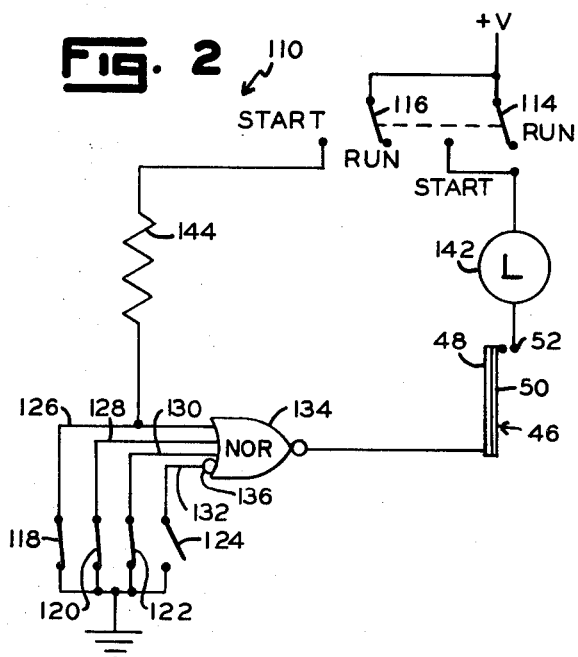
FIG. 2 is an illustrative block diagram of a second embodiment of the brake failure warning system.

Referring now to FIG. 2, like components, as shown in FIG. 1, will be represented by the same reference numerals increased by 100. The difference between FIGS. 1 and 2 resides in the bimetal switch 46 of FIG. 2 which replaces multi-vibrator 38 and NAND gate 40 shown in FIG. 1. Therefore, when the ignition switch 12 of the automotive vehicle is in either the START or the RUN condition so that a voltage is applied to one side of indicator lamp 142, and the output of NOR gate 134 is at a ground potential, current will flow through indicator lamp 142 and bimetal switch 46 thereby causing indicator lamp 142 to glow. However, the current through bimetal switch 46 will cause the two metals 48 and 50 to expand at different rates thereby breaking contacts 52. As the metals 48 and 50 begin to cool, contacts 52 will again close allowing current to flow through indicator lamp 142. The opening and closing of contacts 52 which is normally in the range of 1 to 2 cycles per second will cause the indicator lamp 142 to flash. Though not specifically shown in the figure, it is understood that NOR gate 134 receives voltage from the vehicle battery +V whenever the ignition switch 12 is in the START or RUN position. Also, wiper arm 116 and 114 have an OFF position (not shown) to prevent the battery voltage +V from being connected to warning indication system 10. The self test through resistor 144 and wiper arm 116 operate as previously mentioned in conjunction with FIG. 1.

Figure 3:
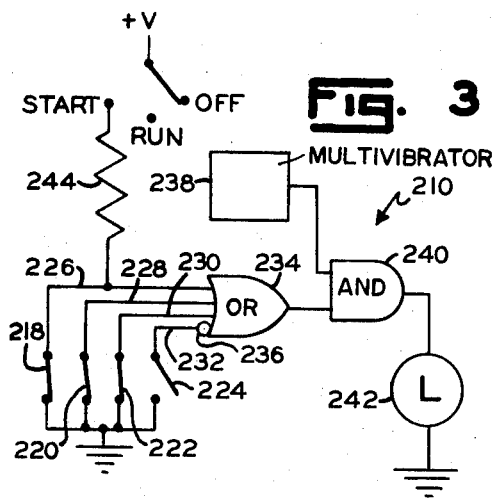
FIG. 3 is an illustrative block diagram of a third embodiment of the brake failure warning system.

Referring now to FIG. 3, like components as shown in FIG. 1 will be represented by the same reference numeral increased by 200. The essential difference between the embodiment shown in FIG. 3 and the embodiment shown in FIG. 1 resides in the connection of the indicator lamp 242. In FIG. 1, the lamp 42 was connected directly to the voltage source +V. However, in FIG. 3 the lamp 242 is connected directly to ground. Upon receiving a positive voltage output from AND gate 240, the indicator lamp 242 will glow. Again when an out-of-tolerance condition exists the multi-vibrator 232 interrupts the output of AND gate 240 to flash the indicator lamp 242 at an approximate rate of 1 to 2 cycles per second. Though not shown in FIG. 3, it should be understood that multi-vibrator 238, OR gate 234 and AND gate 240 receive their voltage from the vehicle battery +V whenever the automotive vehicle ignition switch 12 is in the START or RUN position. All voltage is removed when the ignition switch 12 is OFF. Also, an automatic test is included by resistor 244 to self test the indicator 242 when the ignition switch 12 is in the START position.

Figure 4:
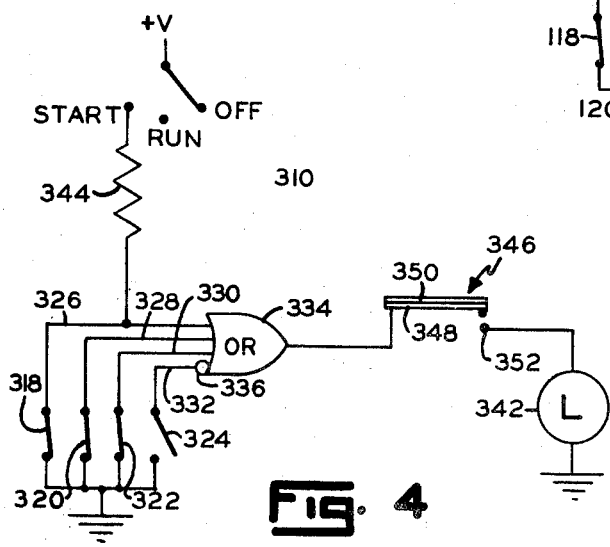
FIG. 4 is an illustrative block diagram of a fourth embodiment of the brake failure warning system.

Referring now to FIG. 4, wherein like components are represented by the same reference numerals as the reference numerals used in FIG. 1 increased by 300. The indicating lamp 342 is connected to ground the same as shown in FIG. 3. Hence, when the voltage is applied to the other side of indicator lamp 342, the lamp will glow warning the vehicle operator that an out-of-tolerance condition in the braking system exists. An out-of-tolerance condition sensed by switch 318, 320, 322 or 324 will generate a voltage output from OR gate 334. The current output from OR gate 334 will begin to flow through bimetal switch 346, which is the same as bimetal switch 46 shown in FIG. 2. As described in conjunction with FIG. 2, the current through bimetal switch 346 will cause the two metals 348 and 350 to expand at different rates. Because of the different expansion rates of metals 348 and 350, the contact 352 will be broken. Because the contact 352 has been broken, current no longer flows through bimetal switch 346. Subsequently, as the two metals 348 and 350 begin to cool, they again resume their normal position to close contacts 352. The frequency of operation of the bimetal switch 346 can be anywhere from between 0.2 to 5 Hertz. Hence, when an out-of-tolerance condition that is monitored by the switches 318, 320, 322 or 324 exists, the indicator lamp 342 will flash at a rate clearly visible by the vehicle operator. Again, as previously described, an automatic test is included through resistor 344 for testing the brake failure warning system 310 when the automotive vehicle switch 12 is in the START position. Though not shown in the drawings, the OR gate 344 will receive power from the vehicle battery +V when the ignition is in either the START or the RUN position.

Though there are many ways of implementing the design as illustrated in the embodiments shown in FIG. 1 through 4, the following description of FIG. 5 will explain in detail one method of implementing the invention. Though functionally FIG. 5 is the same as FIG. 1, there will be some design changes concerning the incorporation of the electronic control unit switch 24. When possible, the same reference numerals in FIG. 1 will be used in FIG. 5. The essential difference between FIG. 1, which is one of the simplest possible designs, and the schematic of FIG. 5 resides in the construction of OR GATE 34 and inverter 36. The OR gate 34 and inverter 36 have been replaced with a NOR gate 35 and an inverter 37 (not shown in logic form) for the output thereof. The switches 22, 18 and 20 provide the ground inputs for the NOR gate 35 which is inverted by inverter 37 to provide the same function as OR gate 34 of FIG. 1. Switch 24 is not connected to NOR gate 35 or inverter 37. Instead, it bypasses this part of the circuit as will be subsequently described. The reason for going to this type of configuration is because the fluid level switches are, in this particular case, of the carbon type. Because the resistance of carbon is in the semiconductor group, and the resistance of the brake fluid varies over a wide range, a NOR gate 35 is needed to detect when a fairly large valued resistance becomes essentially infinite.

The vehicle battery +V is fed in through double pole, double throw ignition switch 12 to wiper arm 14, and 16 to supply power to the brake failure warning system 10. Notice that when the ignition switch is in either the START or the RUN position +V is connected to indicator lamp 42 and the voltage bus 54.

Starting first with the pressure differential switch 22, it is connected in series between a ground bus 56 and voltage dividing resistors 58 and 60, with the connection between the resistors 58 and 60 being connected to the base of NOR gate transistor 62. The emitter of transistor 62 is connected to the junction of voltage dividing resistors 64 and 66 that are connected between the voltage bus 54 and the ground bus 56. Hence, the emitter of transistor 62 is at some voltage potential. As long as the base of transistor 62 is at some voltage potential lower than the emitter, then the transistor will not conduct so that the collector-to-emitter voltage is high. If the switch 22 should open due to a pressure differential in a braking system during the application of the vehicle brakes, the voltage from the voltage bus 54 is coupled through resistor 58 to the base of transistor 62 thereby increasing the base voltage above the emitter voltage. As the base voltage sufficiently exceeds the emitter voltage of transistor 62, the transistor will conduct and develop a voltage potential across resistor 78 which in turn causes transistor 76 to conduct.

Also, combining with transistor 62 to form a NOR gate are transistors 68 and 70 wherein fluid level switches 18 and 20 are both connected on one side to ground bus 56. The other sides of fluid level switches 18 and 20 are connected to the bases of transistors 68 and 70 and through resistors 72 and 74, respectively, to the voltage bus 54. The emitters of transistors 68 and 70 are normally at a higher voltage potential than the bases of the transistors as provided by voltage dividing resistors 64 and 66. Because fluid level switches 18 and 20 tend to vary in resistance as the resistance of brake fluid varies over extended resistance values, the ratio of resistor 66 to resistor 64 must be rather large to set emitter bias of transistors 62, 63 and 70. Assume that fluid level switch 18 is opened because of a low fluid level in the braking system. Then because the full amount of the voltage bus 54 through resistor 72 is developed on the base of transistor 68, the transistor will conduct thereby developing a voltage potential across resistor 78. Likewise, if fluid level switch 20 should open, transistor 70 will conduct causing a voltage potential across resistor 78. Since the collectors and emitters of transistors 62, 68 and 70 are all common, the conduction of any one of these transistors causes voltage potential to be developed across resistor 78 to the base of transistor 76. Since transistor 76 is at PNP transistor wherein the previously described transistor 62, 68 and 70 are NPN transistors, if the base of the PNP transistor 76 is of a sufficiently lower voltage potential than the emitter, then transistor 76 will conduct and the collector of the transistor 76 will have a high voltage potential.

The collector of transistor 76 is connected through resistor 80 to the base of NAND gate transistor 82. Transistor 82 is connected in series with NAND gate transistor 84 so that if the positive voltage signal is received at the base of both transistors, then they will begin to conduct. When the NAND gate transistors 82 and 84 conduct, the current supplied through indicator lamp 42 to the ground bus 56 will cause the indicator lamp 42 to light up. The input to the base of transistor 84, as will be subsequently described, is the output from the multi-vibrator. Notice that transistor 82, which forms one half of a NAND gate circuit with transistor 84, can be bypassed if a ground is applied by the adaptive braking control unit which thereby indicates an adaptive braking failure. The ground is supplied by switch 24 which leaves the NAND gate as a one input gate.

At this point it should be noted that if one of the switches 18, 20 or 22 should open or a ground is applied from the adaptive braking control unit, then the indicator light 42 will flash at a rate determined by the input from the multi-vibrator to NAND gate transistor 84. It should be obvious to those skilled in the art that numerous other functions could be monitored by the inclusion of additional OR or NOR gate transistors or the providing of other sources of ground to the indicator lamp 42. Also by the periodic interruption of the current carrying path supplied to indicator lamp 42, the lamp will flash.

Briefly mentioning the multi-vibrator 38, when the voltage bus 54 is energized, one of the multi-vibrator transistors 86 or 88 will start to conduct. After a given time period the transistor will stop conducting and the other transistor will start conducting. The design of the multi-vibrator 38, which is well known to those skilled in the art, includes appropriate valves of resistors 94, 96, 98 and 100 and capacitors 90 and 92 to determine the length of time the transistors 86 and 88 will alternately conduct. The alternate conduction of transistors 86 and 88 determine the frequency of operation of the lamp 42.

For coupling purposes, transistor 86 is connected through resistor 104 to the base of transistor 102 so that a positive voltage on the collector of transistor 86 when it is non-conducting will stop the conduction of transistor 102. When transistor 102 is conducting, the collector current flows through resistor 106 to the base of AND gate transistor 84 to get the multi-vibrator input to flash indicator lamp 42 as previously described.

Diode 108 is used to prevent negative voltage spikes on the voltage bus 54 from causing damage to the circuit. Also, resistor 44 which is connected to the base of transistor 62 provides an automatic test when wiper arm 16 of the ignition switch is in the START position. Resistor 44 could have been connected to the base of transistor 68 or 70. Diode 109 is used to prevent current flow through resistors 58 and 44 and starter solenoid coil (not shown) to ground.

It should be obvious to those skilled in the art that the resistor transistor logic could be replaced by diode-transistor logic or relay logic. Though only four embodiments were shown in FIGS. 1 through 4, and one in specific detail in FIG. 5, it should be obvious to those skilled in the art that many other combinations are possible. The AND-OR logic could be replaced with NAND-NOR logic or combinations thereof. Also, many other parameters not necessarily associated with the braking system could be monitored.

I CLAIM:

1. A vehicle malfunction indicator system comprising:
    a plurality of sensors, each of said sensors being adapted to detect a malfunction in a component of the vehicle;
    an indicating device;
    first gating means having an output and a plurality of inputs, each of said inputs being connected to a different one of said sensors, said first gating means producing an output signal whenever any of the sensors connected to any of its inputs produces an output signal;
    second gating means having an output connected to said indicating device and a pair of inputs, one of said inputs being connected to the output of said first gating means; and
    pulse generating means connected to the other input of said second gating means, whereupon the latter produces a pulsating output signal when said first gating means produces an output signal, thereby causing pulsating actuation of said indicating device when any of said sensors senses a malfunction.

2. The invention of claim 1:
    said pulse generating means including multi-vibrator means having a frequency output between 0.2 and 5 Hertz;
    said second gating means being an AND gate.

3. The invention of claim 1:
    said vehicle having a starting switch for starting the vehicle's engine; and
    means transmitting a signal to one of the inputs of said first gating means when said starting switch is actuated whereby said indicating device is actuated whenever the engine of the vehicle is started.

* * * * *